United States Patent Office 3,577,329
Patented May 4, 1971

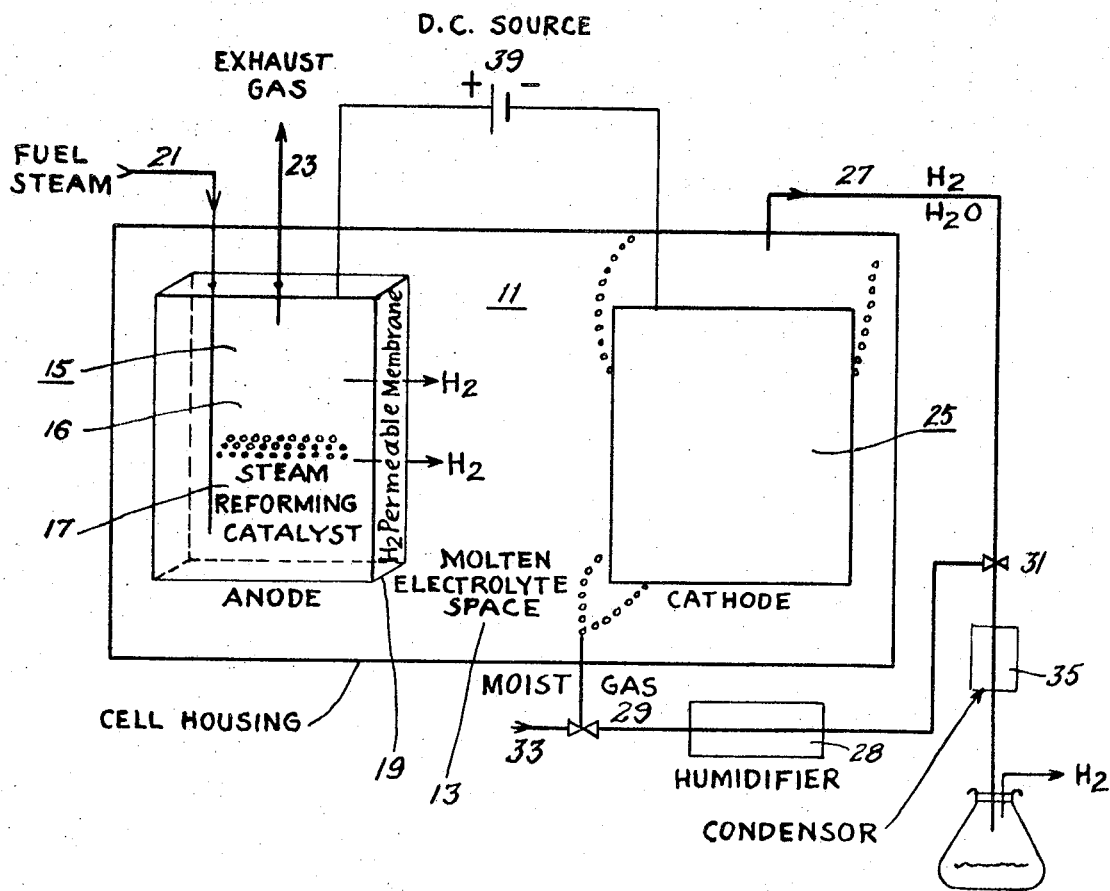

3,577,329
PROCESS FOR THE PRODUCTION OF HIGH PURITY HYDROGEN
Harold Shalit, Drexel Hill, Pa., assignor to Atlantic Richfield Company, Philadelphia, Pa.
Filed Mar. 17, 1969, Ser. No. 807,865
Int. Cl. C01b *13/04;* H01m *27/20*
U.S. Cl. 204—60                                              9 Claims

ABSTRACT OF THE DISCLOSURE

An improved process and apparatus for the production of hydrogen of high purity whereby a carbonaceous fuel is reformed to produce hydrogen and said hydrogen is recovered economically from said reforming operation through the use of an electrolytic process using chemical energy of the reforming process to reduce electrical energy needed and wherein a moist gas is added to the electrolyte to facilitate the electrolytic recovery of hydrogen at the cathode.

RELATED APPLICATION

Ser. No. 527,962, entitled Fuel Cell Electrodes, filed Feb. 16, 1966, now abandoned.

BACKGROUND OF THE INVENTION (1) Field of the invention

This invention relates to methods of electrochemically producing high purity hydrogen from carbonaceous feeds and to the apparatus used for said hydrogen production process.

(2) Description of the prior art

Hydrogen is generated or produced either as a reaction product or as a decomposition product. Some of the principal methods for the production of hydrogen include: (a) the electrolytic process in which hydrogen is obtained by the electrolysis of water or as a by-product in other electrochemical processes such as the electrolysis of aqueous solutions of sodium chloride; (b) the hydrocarbon decomposition process; (c) the steam-methanol process; (d) the steam-iron process; (e) the water-gas process; (f) the non-hydrocarbon dissociation process; (g) the steam process utilizing natural gas or propane; and (h) the partial oxidation process.

Recent developments have led to greater requirements for high purity hydrogen. The aforementioned processes, with the exception of the electrolytic production of hydrogen, produce hydrogen in an impure form which must later be purified to meet the requirements of the hydrogen user. Prior art methods of purifying hydrogen include "scrubbing" the gas stream with materials such as caustic soda and potassium carbonate solutions and alkali metal chlorides. Gas fractionation and washing with liquid nitrogen are also used. Membranes have been developed which are selectively permeable only to hydrogen. The permeability of such membranes may vary with the thickness of the membrane, its composition, and with the temperature and pressure under which the membrane is used. At room temperature using conventional electrolysis the theoretical voltage required to electrolyze water is 1.23 volts while due to internal losses commercial processes require a potential difference of approximately 2 volts or greater to actually electrolyze water. Under these conditions the power costs in conventional electrolysis is approximately 85 to 90 percent of the hydrogen production costs, hence the production costs in prior art processes for electrolytical production of pure hydrogen have been prohibitive.

SUMMARY OF THE INVENTION

Briefly the apparatus and process of my present invention involves a steam reforming anode and a hydrogen evolving cathode immerced in molten electrolyte and having an outside source of D.C. current connected across the electrodes. When the apparatus is used in accordance with this disclosure high purity hydrogen can be produced at a cost that is competitive with that found in the hydrogen production industry. The reactions involved are (using $CH_4$ for example as fuel)

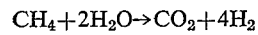
$$CH_4 + 2H_2O \rightarrow CO_2 + 4H_2$$
$H_2$ diffuses through membrane (anode)
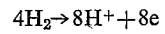
$$4H_2 \rightarrow 8H^+ + 8e$$
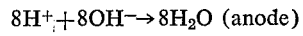
$$8H^+ + 8OH^- \rightarrow 8H_2O \text{ (anode)}$$
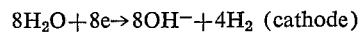
$$8H_2O + 8e \rightarrow 8OH^- + 4H_2 \text{ (cathode)}$$

The steam reforming anode is designed for in situ hydrogen generation while immersed within the electrolyte. The aforementioned co-pending application describes an anode suitable for use in this invention and said application is incorporated by reference. The anode has a reforming chamber having a surface permeable only to hydrogen at the process operating temperature. This permeable surface may be a membrane in the form of a tube or a thimble, or the membrane may be incorporated as a wall of the reforming chamber. Suitable membranes may be constructed of palladium, palladium-silver alloys, other palladium alloys, or base metals with a palladium coating on both sides. When using palladium coated base metals, the palladium should be applied to the base metal by explosive bonding, electroplating, vacuum sputtering, or other methods which will not allow an intervening metal oxide film between the palladium and the base material. Suitable base metals are tantalum, wolfram, zirconium, iron and nickel. A steam reforming catalyst is placed in the reforming chamber by conventional means. Suitable catalysts are supported nickel, alkali impregnated supported nickel, supported palladium or platinum, or any other known steam reforming catalyst. The anode is provided with inlet and outlet tubes so that a fuel gas and steam may be charged into the reforming chamber and exhaust gases of the reforming reaction removed therefrom.

The molten electrolyte should be a liquid material boiling at above 600° C. which has a good electrical conductivity and is stable under the temperature and chemical conditions of the cell. Molten salts, preferably alkali metal hydroxides including lithium hydroxide, sodium hydroxide, potassium hydroxide, cesium hydroxide, and rubidium hydroxide, or combinations thereof, are suitable electrolytes. Molten acid sulfates, phosphoric acid, acid sulfonates, and bicarbonates etc., are also suitable electrolytes for this purpose.

The cathode may be any electrical conductor which is relatively inert to the electrolyte, and preferably is a sheet of metal of low hydrogen over-voltage such as nickel, platinum or palladium or a sintered form of these materials. It is preferable that the cathode material be catalytic for the evolution of hydrogen from water.

During operation of my apparatus the ionized hydrogen passing through the membrane reacts with the molten hydroxide ions to form water. This water passes through the electrolyte to the cathode where it is electrolized to produce hydrogen and return the hydroxide ions used in the anodic reaction to the electrolyte. By eliminating the oxygen producing anode from my electrolysis process I have eliminated one of the greater voltage loss sources found in conventional electrolysis. Furthermore, the theoretical voltage required to electrolyze water under the operating temperature of my process is less than 0.95 volt as opposed to 1.23 volts required when operating at room temperature. With these two factors working to my benefit I have found that it is possible to produce hydrogen with a cell voltage of less than 0.5 volt and a current density of at least 200 ma./cm.$^2$ of electrode surface using the process and apparatus of my invention.

During prolonged operation of the apparatus of my invention it sometimes becomes necessary to increase the voltage in order to maintain hydrogen production. I have discovered that the water produced in the anodic reaction does not pass through the electrolyte to the cathode at 100 percent efficiency and that some of the water leaves the cell along with the hydrogen. In order to compensate for this water loss and maintain low voltage operation I have found that the introduction of a small amount of water to the catholyte insures availability of water necessary for the cathode reaction. Some of the moist hydrogen from the product stream can be recycled through the catholyte or steam may be introduced into the catholyte on a carrier such as nitrogen. Only small amounts of steam additions to the catholyte are required to insure that a stoichiometric amount of water is available for the cathodic reaction. An amount equivalent to 10 to 100 percent of the water needed to produce the hydrogen may be introduced. This range is preferably 20 to 75 percent and I have used 50 percent with exceptionally good results. Table 1 depicts the advantage of adding water to the catholyte as opposed to using only the water produced at the anode. If water is removed from the catholyte without replacement, the cell voltage steadily increases until at about 2.5 volts the alkali metals deposit themselves on the cathode.

TABLE 1

| Cathode material | Cell voltage at 2 a. current (150 ma./cm.$^2$) | Duration | | Voltage increase, volts/10 hrs. | | |
|---|---|---|---|---|---|---|
| | | Hrs. | Cell | Anode | Cathode | |
| Ni pot [1] | 1.36 | 40 | .104 | .039 | .069 | |
| Platinized Ni pot | .36 | 64 | .079 | .028 | .050 | |
| Pd tube | .47 | 17 | .25 | .068 | .188 | |
| Ni pot—steam N$_2$ | .18 | 65 | 0 | 0 | 0 | |

[1] Average of 5 runs.

In general, the objectives of this invention can be accomplished by utilization of steam reforming-electrochemical apparatus at high temperatures with the addition of moist gas to the catholyte.

An object of the present invention is to provide an improved process and apparatus for the production of high purity hydrogen at the cathode of an electrolytic cell.

Another object is to replace electrical energy with less expensive chemical energy in a hydrogen production process.

A further object is to provide a new and improved hydrogen production process and apparatus that is economically competitive with present commercial processes.

Other objects will become apparent from the description hereinafter developed and from consideration of this disclosure in connection with the drawing.

BRIEF DESCRIPTION OF THE DRAWING

The figure is a diagrammatical representation of an electrolytic cell with a reforming chamber therein. In the cell hydrogen passes through a selectively permeable membrane into the electrolyte forming water which is carried to the cathode where hydrogen is evolved and collected.

DESCRIPTION OF THE PREFERRED EMBODIMENT

Referring to the figure, the electrolytic cell 11 is filled with a molten hydroxide electrolyte 13. The anode 15 having a reforming chamber 16 therein containing a supported nickel steam reforming catalyst 17 is immersed in the electrolyte. One wall of said anode is constructed of a palladium-silver alloy membrane 19, permeable only to hydrogen at the operating temperature of the process, which is between 400 and 600° C. Preferable operating temperature for the cell is between 450 and 50° C. The anode has a conduit 21 suitable for introducing fuel and steam into the reforming chamber.

The fuel, which may be methane, ethane or other gaseous hydrocarbons, gasoline or other liquid hydrocarbons, carbon monoxide or carbon monoxide containing gases such as water gas, methanol or other volatilizable carbonaceous material, is charged to the anode in a ratio of at least 2 moles of water per mole of carbon in the carbonaceous fuel; preferably the ratio is about 2.2 to 5.0 moles of water per mole of carbon in the carbonaceous fuel. Although higher ratios can be used, the preferred range pushes hydrogen production close to theoretical maximum under the operating conditions. The anode also contains a conduit 23 for removing exhaust gases from the reforming chamber.

The cathode 25 is a sheet of porous nickel, which may have a catalyst deposited thereon, which is immersed in the molten electrolyte. A conduit 27 in the electrolytical cell housing in the vicinity of the cathode collects the hydrogen evolved at said cathode and removes it from the cell.

Evolution of hydrogen at the cathode uses water from the electrolyte and moisture must be continually added to the catholyte in order to maintain a low voltage and prevent alkali metal from the electrolyte from being deposited on the cathode. This moisture may be provided by recycling some of the moist hydrogen through a humidifier 28 and through conduit 29 by adjusting valve 31. An outside source of water vapor 33 will also serve the purpose of maintaining the catholyte in a moist state. The gas collected in conduit 27 can be passed through a condenser 35 and collected as practically pure product.

An outside D.C. current source 39 is connected across the anode 15 and the cathode 25. Application of the current causes the electrode reactions previously described to take place. Constant removal of hydrogen from the outside surface of the anode by the anodic reaction creates an extremely low hydrogen partial pressure at that point which allows hydrogen diffusion from inside the reforming chamber at a high rate. The cathodic reaction evolves hydrogen at a rate equivalent to the diffusion rate of hydrogen through the membrane and this evolved hydrogen is removed from the cell through conduit 27.

EXAMPLE 1

A cell was set up consisting of a palladium thimble anode working against various cathodes in a molten electrolyte at 475° C. composed of 90 percent sodium hydroxide and 10 percent potassium hydroxide. Hydrogen was charged into the anode thimble and a potential was applied across the cell. Hydrogen was evolved in the cathode at coulombic efficiencies of about 100 percent; however, the cell voltage had to be increased continually to maintain the initial current density. By introducing a small amount of steam in a carrier gas (moist hydrogen) into the catholyte the voltage of the cell could be maintained at the initial low voltage. When water was introduced at the stoichiometric amount required for the cathode reaction, a cell potential of 0.18 volt required to sustain the initial current density, remained constant for at least 65 hours, the duration of the experiment. Subsequent runs indicated that ½ the equivalent amount of water yields equally satisfactory results. When the water feed was interrupted during hydrogen evolution the cell voltage would increase, however reintroduction of water into the catholyte would reduce the voltage to its initial level of 0.18 volt.

EXAMPLE 2

Using a palladium thimble anode containing "Girdler G-60-RS" steam reforming catalyst in the reforming chamber a methane-steam mixture was charged to the anode, the steam-methane ratio being maintained at about 2.5 moles of steam per mole of carbon in the carbonaceous fuel. This reforming anode was opposed by a nickel screen cathode, the combination being immersed in a molten electrolyte consisting of 90 percent sodium hydroxide and 10 percent potassium hydroxide at about 475° F. A small nitrogen stream containing water was charged to the catholyte. The cell was run at a total current of about 3 amps (about 200 ma./cm.$^2$). The required voltage for this current was 0.3 to 0.33 volt and it remained essentially constant during a 75 hour run. The humidified nitrogen carried into the cell ½ the stoichiometric amount of water needed by the cathode reaction, the balance apparently being supplied by diffusion from the anode. The hydrogen formed at the cathode corresponds closely to 100 percent of the current drawn (100 percent current efficiency) and also to about 80 percent of the methane charged to the anode (about 80 percent fuel utilization efficiency).

I claim:
1. A process for the production of hydrogen gas utilizing a cathode and a steam reforming anode, both immersed in a molten electrolyte and having a D.C. current imposed across said electrodes which comprises:
    charging steam and fuel to said anode to produce hydrogen,
    passing the hydrogen gas produced through a surface of the anode and into the electrolyte,
    reacting said hydrogen with hydroxide ions of the electrolyte to form water,
    electrolyzing said water at the cathode to produce hydrogen,
    adding water to the catholyte to provide moisture for said electrolyzing reaction, and
    collecting said hydrogen.
2. The process of claim 1 wherein the electrolyte is maintained between 400 and 600° C.
3. The process of claim 1 wherein the electrolyte is maintained between 450 and 550° C.
4. The process of claim 1 wherein the imposed D.C. current density is greater than 200 ma. per cm.$^2$ and the potential difference is less than 0.95 volt.
5. The process of claim 1 wherein the steam and fuel are introduced to the reforming chamber in the ratio of 2.2 to 5.0 moles water per mole carbon in the fuel.
6. The process of claim 1 wherein the additional water introduced at the catholyte is in the form of steam on an inert carrier.
7. The process of claim 1 wherein the additional water introduced at the catholyte is moist hydrogen gas recycled from the product stream.
8. The process of claim 1 wherein the electrolyte is a molten salt.
9. The process of claim 8 wherein the molten salt electrolyte contains alkali metal hydroxide.

References Cited
UNITED STATES PATENTS

| | | | |
|---|---|---|---|
| 3,416,966 | 12/1968 | Oswin | 136—86C |
| 3,180,813 | 4/1965 | Wasp et al. | 136—86C |
| 1,543,357 | 6/1925 | Baur | 204—129 |

JOHN H. MACK, Primary Examiner

R. L. ANDREWS, Assistant Examiner

U.S. Cl. X.R.

136—86C; 204—129